United States Patent Office 3,083,680
Patented Apr. 2, 1963

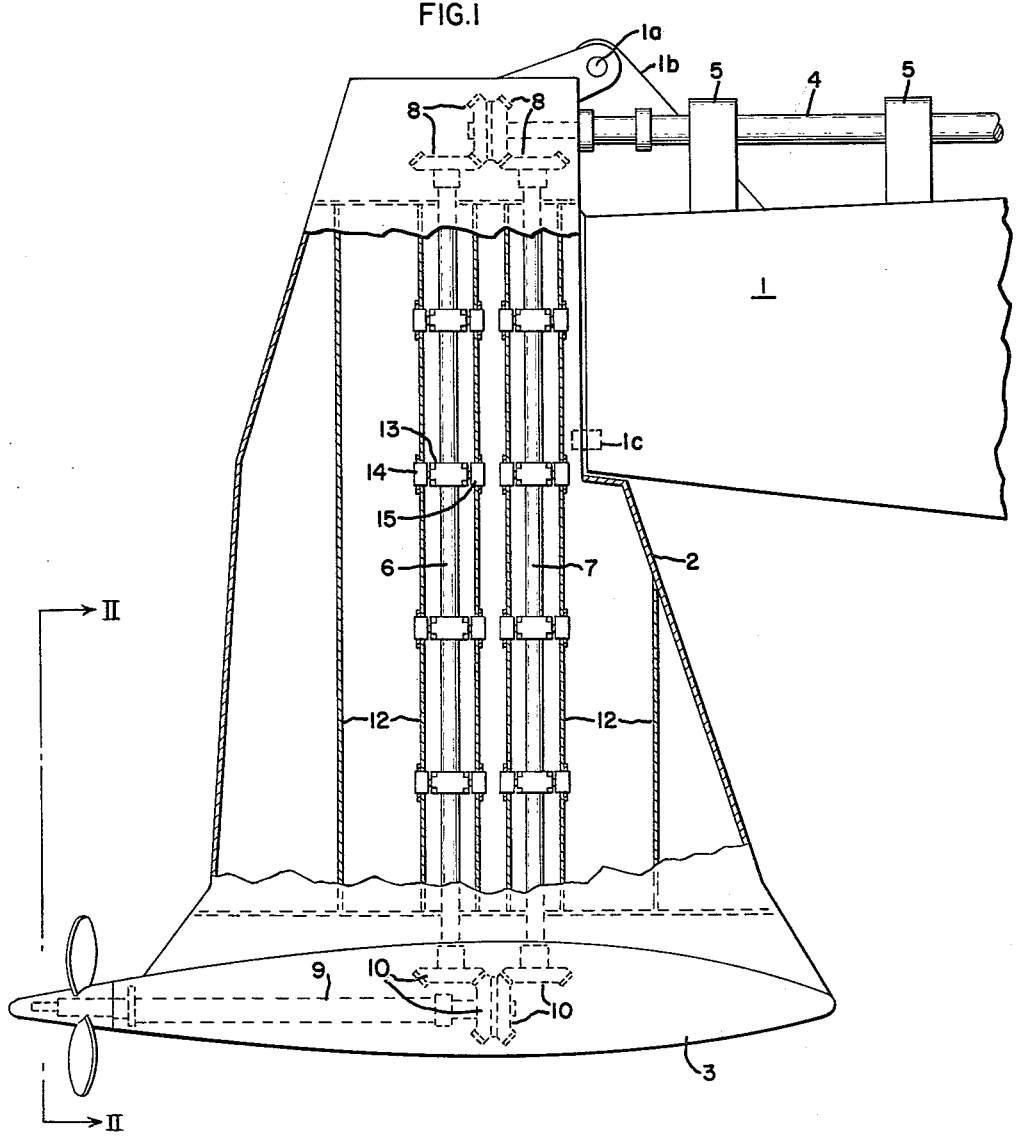

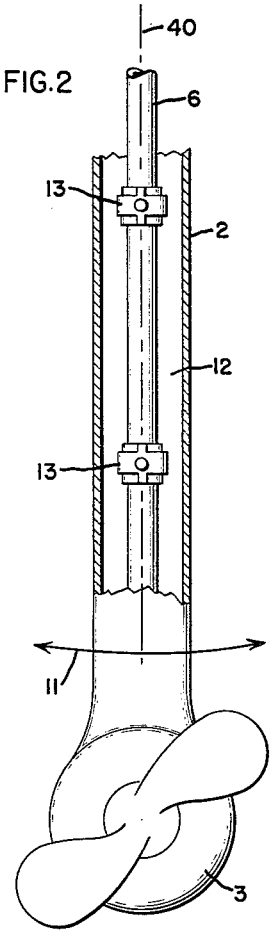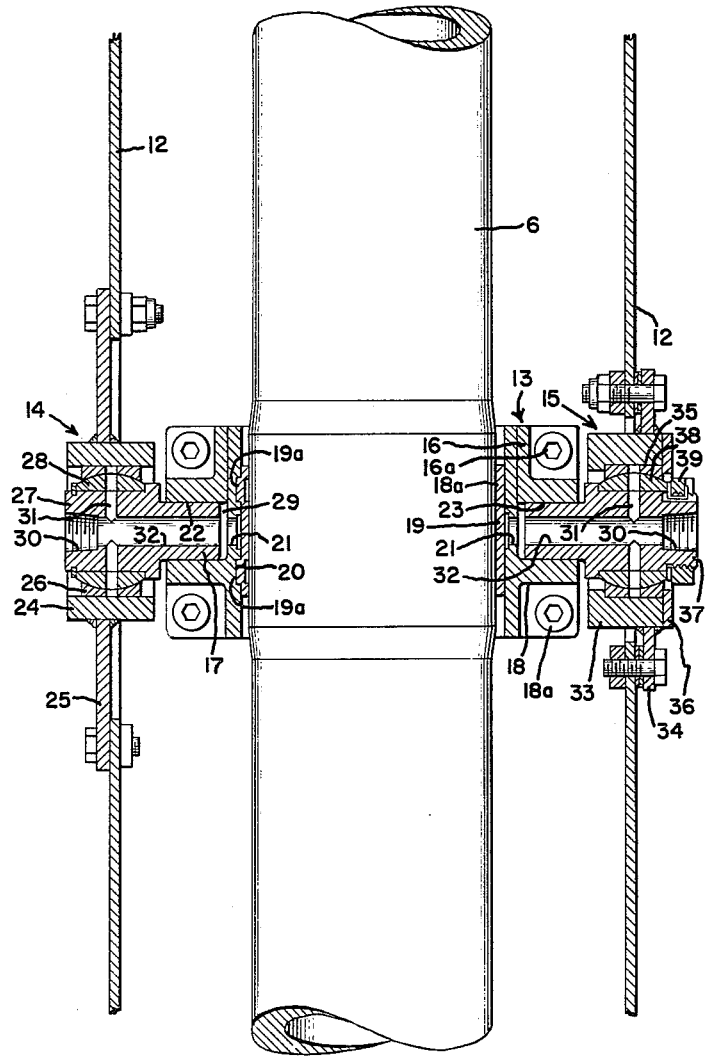

3,083,680
FLEXIBLE DRIVE-SHAFT ASSEMBLY WITH
SELF-ALIGNING BEARINGS
Robert J. Willis, Jr., Nahant, and Henry Sorensen,
Marblehead, Mass., assignors to General Electric Company, a corporation of New York
Filed Dec. 27, 1961, Ser. No. 162,408
5 Claims. (Cl. 115—34)

This invention relates to self-aligning bearing arrangements for long flexible shafts, and more particularly to an arrangement for supporting flexible drive shafting in a housing structure which is also subject to deflection.

It is sometimes necessary to transmit torque by means of a relatively long shaft where the supporting housing or frame structure for the shaft is not rigid but is flexible. One such application is found in a hydrofoil vessel, where power is transmitted through one or more vertical shafts to a propeller pod supported some distance below the vessel on a strut. Since the strut is unsupported on its lower or "pod" end, erratic transverse deflecting forces due to motion of the vessel, course changes, sea conditions, etc., will cause the strut to deflect somewhat in the manner of a cantilever beam. The shaft (or shafts) passing through the strut, which may be as much as 20 feet long, is thus designed to be relatively flexible so that it may flex to accommodate the strut deflections while carrying the torque loads imposed upon it. However, the deflection pattern of the shaft may differ substantially from the deflection pattern of the strut, since the type of support is different, and also since the materials and section moduli of the strut and shaft will be different. Therefore, very rarely will the neutral axis of the shaft exactly correspond with the neutral axis of the strut during deflection.

Since the shaft is designed to be flexible, it must necessarily be supported at several places along its length. This method of support, together with the aforementioned non-conformance of strut and shaft neutral axes during deflections, requires that the bearings will place some sort of restraint on the shaft and cause the neutral axes to conform at spaced intervals. If the restraint is other than radial, i.e., normal to shaft axis, excessive bearing wear will occur and also undesirable local bending moments will be communicated from the bearings to the shaft.

Accordingly, one object of the present invention is to provide an improved arrangement for supporting a relatively flexible torque transmitting shaft from a structure which is itself subject to deflecting forces.

Another object of the invention is to provide an improved arrangement for supporting the vertical drive shafting in the stern strut of a hydrofoil vessel.

Another object of the invention is to provide an improved self-aligning bearing which will adjust relative to a movable shaft-supporting structure so as to reduce bearing wear.

Still another object of the invention is to provide an improved self-aligning bearing arrangement for supporting a flexible vertical shaft in the strut of a hydrofoil vessel at a number of locations.

The subject matter which is regarded as the invention is particularly pointed out and distinctly claimed in the concluding portion of the specification. The invention, however, both as to organization and method practice, together with further objects and advantages thereof, may best be understood by reference to the following description taken in connection with the accompanying drawings in which:

FIG. 1 is a diagrammatic elevation drawing showing the stern and portions of the propulsion mechanism for a hydrofoil vessel.

FIG. 2 is an end view of a portion of the strut and propeller pod taken along lines II—II of FIG. 1; and FIG. 3 is an enlarged elevation drawing, partly in section, showing the details of the self-aligning bearing.

Briefly stated, the invention is practiced by supporting a long flexible shaft in a structure subject to transverse deflecting forces by means of a number of bearings spaced along the shaft. The bearings are attached to the supporting structure with universal connections, so that the bearings can align themselves with the slope of the shaft, thus imposing only radial restraints on the shaft.

Referring to FIG. 1 of the drawing, the stern of a hydrofoil vessel 1 supports a hollow strut 2, the lower end of which supports a propeller pod 3. A horizontal drive shaft 4, supported in pedestals 5, is driven by a prime mover (not shown). Although the particular gearing arrangement is not material to the present invention, since different arrangements might use only one shaft or even concentric shafts, the embodiment disclosed here employs twin shafts 6, 7. Shafts 6 and 7 are driven at their upper ends by bevel gears 8 and transmit power at their lower ends to a propeller shaft 9 by means of bevel gears 10.

Reference to FIGS. 1 and 2 of the drawing illustrates that the strut 2 is supported through pivot pins 1a located in spaced pedestals 1b and held by a detachable locking mechanism indicated at 1c. The strut 2 is relatively long in the fore-and-aft direction but is quite narrow in the beam-to-beam (transverse) direction, in order to provide stability without undue resistance to the water. Although some movement of the pod in the fore-and-aft direction, in a "pitching" direction, and also some twisting about the vertical axis can occur, the greatest concern is with transverse deflections in the athwartships or beam-to-beam direction as indicated by the arrow 11 in FIG. 2. In order to reduce this deflection as much as possible, the inner construction of strut 2 in FIG. 1 indicates that a number of vertical transverse beams 12 are employed, which function much as the longitudinal spars in an airplane wing to reduce the span-wise deflections. Shafts 6, 7 are supported between beams 12 by bearings 13 held in universal support brackets 14, 15 now to be described in detail.

Reference to FIG. 3 of the drawing shows that shaft 6 is held in a journal bearing indicated generally at 13 between two universal mounting brackets indicated generally as 14 and 15.

The bearing 13 includes a split bearing housing 18 held together by bolts 18a and containing a split bearing liner 19. The bearing housing 18 is bolted and doweled (not shown) to a ring 17 which includes two diametrically opposite integral trunnion stubs 27, 37. To ensure sufficient stiffness and rigidity of the bearing, a split clamp 16 held together by bolts 16a is clamped around the top of the bearing housing 18. This clamp 16 is also attached to ring 17 by bolts and dowels (not shown). The bearing liner 19 has enlarged protuberances 19a which fit into mating recesses 20 of the bearing housing 18 to prevent the bearing liner 19 from becoming dislodged. The bearing housing 18 includes circumferentially spaced holes 21 for feeding oil to the journal.

On the two trunnions 27 and 37 are mounted two ball-and-socket (universal) bearings consisting of inner balls 28 and 38 respectively held in split spherical sockets 26 and 35. By means of the ball-and-socket (universal) bearings, the bearings 13 is thus attached to the brackets 14 and 15.

The brackets 14 and 15 perform similar supporting roles but, inasmuch as the mechanical details differ slightly, they will be described separately.

Bracket 14 comprises a supporting collar 24 attached such as by welding to a plate 25 bolted to beam 12. Collar 24 serves as a mount for socket 26. It should be noted that socket 26 is slidable along the axis of collar 24.

Lubrication is provided from either of the two threaded sockets 30 arranged to be connected to a conventional lubrication supply hose (not shown). Sockets 30 connect with central bores 32 leading to a circumferential feed chamber 29 between ring 17 and bearing housing 18. The central bores 32 also connect with radial passages 31 leading to the universal ball-and-socket members. Thus, one of the lubrication sockets 30 can supply oil to the journal from feed chamber 29 through ports 21 and also can supply both universal ball-and-socket joints. The other socket 30 may then be used to connect a bearing temperature indicator for monitoring bearing temperature.

Bracket 15 is similar to bracket 14 except that the socket 35 is rigidly held in the supporting collar 33, preventing movement along the axis of the collar. The ball 38 is locked to trunnion 37 by nut 39 and the socket 35 is locked to the collar 33 by means of retainer plate 36. The bearing assembly 13 is thus held against fore-and-aft movement on one side by bracket 15 but may move in the fore-and-aft direction with respect to bracket 14 by socket 26 sliding in collar 24.

The ball-and-socket or universal mounting brackets 14, 15 are located in a vertical plane dividing the strut 2 through the center. This vertical plane, which coincides with the neutral axis of the strut, is indicated at 40 in FIG. 2. Since the brackets 14, 15 hold the bearing collar 13 at diametrically opposite locations, the neutral axis or centerline of the shafts 6, 7 will also coincide with the neutral axis 40 of strut 2 when the strut is undeflected.

The operation of the improved shaft supporting arrangement may now be described. Sea conditions and operating requirements of the hydrofoil vessel 1 impose erratic deflecting forces on the strut 2 which, since it is unsupported at the lower end, deflects much as a cantilever beam fixed at its upper end, as indicated by arrow 11 in FIG. 2. Although most of the motion takes place athwartships because of the thinness of strut 2 in the transverse direction, there may also be some twisting about the vertical axis and also a slight fore-and-aft and pitching movement as the thrust and torque of the propeller change.

Assuming for purpose of explanation that shafts 6, 7 were not supported in the intermediate portion by bearings 13, and that a transverse deflecting force 11 were applied to the pod 3, the neutral axes of strut and shafts would follow different curves. This would be due to many factors, including type of end support, uniformity and type of cross section, material, etc. However, since shafts 6, 7 are flexible, they must be supported at several points along their lengths, and hence the shaft neutral axis will be forced to conform to the neutral axis of the strut at the points where the bearing are held on the neutral axis of the strut. If conventional fixed bearings were employed, local bending couples would be imposed on the shaft at each bearing.

By means of the universal mounting brackets 14, 15 of the present invention, however, the bearing collars 13 are allowed to twist and become aligned with the slope of the shaft, so as not to impose any local couples thereupon. In other words, the universal mounting connection provides that each bearing exerts a restraining force which is radial to the shaft centerline, rather than causing a short segment of the shaft centerline to be held at an angle which is opposed to the natural deflection pattern of the shaft. Since the bearing housing 18 can impose only radial forces on the shaft at each bearing location, it will be appreciated that this will promote uniform bearing wear along the entire surface of the journal 19, and also it will be appreciated that the journal 19 cannot impose a local bending couple at the location of the bearing, which would increase the total bending moment in the shafts.

Although the primary source of movement calling for restraint on the shaft is due to the relatively large athwartship movement of the strut, the strut can also move in other ways. The bearing is constructed to place either minimum or no restraint on the shaft when the strut moves in these ways.

Thrust on the pod from the propeller creates vertical compressive forces in the forward part of the strut and vertical tensile forces in the after part of the strut. This causes a relative shift of vertical positions between brackets 14 and 15 and also a change in spacing between brackets. The vertical shift is accommodated by rotation of the balls in the sockets while the change in spacing between brackets is accommodated by the provision for one socket to slide axially in the brackets 14. Thus, no restraint is placed on the shaft by this movement.

Twisting of the strut about the vertical axis is provided for in the same manner. Such movement results in a relative horizontal shift between brackets 14, 15 and an increase in spacing. The combination of universal mountings with the provision for one of the mountings to slide prevents restraint on the shaft as before.

Pure bending of the strut in the fore-and-aft direction causes brackets 15 to impose a slight restraint on the shaft but this restraint is merely in a radial direction, as with the much larger athwartship bending described previously.

Therefore, it can be seen that the absolute minimum required restraining forces are placed upon shafts 6, 7, and also that the restraining forces are purely in a radial direction to the natural contour of the shaft. The action of the bearings on the shaft, therefore, is similar to that of a beam freely supported at several points, rather than of a beam which is fully restrained at several points, the latter having a very complicated stress pattern.

Thus, the self-aligning bearing support described provides an improved means for supporting a long flexible shaft in a structure which is also subject to sideways and other types of deflecting forces. The supporting arrangement is particularly useful for supporting one or more vertical shafts in a hydrofoil vessel, where the deflections may be particularly severe at the time that the shafts are transmitting a large torque at relatively high speed. It will also be seen that by radially forcing the flexible shaft to generally follow the deflected neutral axis of the strut, the thickness of the strut in a beam-to-beam direction can be held to a minimum, thus aiding in increasing the overall hydrodynamic efficiency of a hydrofoil vessel.

While there has been described what is at present considered to be the preferred embodiment of the invention, other modifications and advantages will become apparent to those skilled in the art, and it is intended to cover in the appended claims all such modifications as fall within the true spirit and scope of the invention.

What we claim as new and desire to secure by Letters Patent of the United States is:

1. In combination, a hollow first member having a substantial unsupported length and subject to transverse deflecting forces, a relatively flexible torque-transmitting shaft passing through said first member, and a plurality of bearings spaced longitudinally along and journalling said shaft within said first member, each of said bearings being mounted on at least two universal supporting means attached to two spaced portions of said first member to allow the bearings to move relative thereto, said universal means also being attached to allow said portions to move relative to one another, whereby said bearings may align themselves with the local slope of the shaft while holding spaced points on the shaft substantially fixed with respect to the first member when the first member deflects.

2. In combination, a hollow first member which is relatively flexible in a first transverse direction and relatively rigid in a second transverse direction, said first member having a substantial unsupported length and being subject to transverse deflecting forces, a relatively flexible torque-transmitting shaft passing through said first member, a plurality of bearing collars spaced longitudinally along and journalling said shaft, first and second universal mountings supporting each bearing collar, said first and second mountings being disposed in the first hollow member to allow at least said first universal mountings to move without substantial restraint in said second transverse direction but substantially restraining the bearing collars from moving in said first transverse direction, said universal mountings providing for universal rotary movement of the bearing collars with respect to the mountings, whereby the bearing collars may align themselves with the slope of the shaft when the first member deflects.

3. In combination, a hollow strut member supported at only one end thereof and being relatively flexible in a first transverse direction, relatively rigid in a second transverse direction, and subject to transvese deflecting forces, at least one relatively flexible torque-transmitting shaft member disposed in said strut, a plurality of bearings spaced longitudinally along and journalling said shaft, mounting bracket means carried in said strut and substantially fixed against movement with respect to the strut in said first transverse direction, universal means supporting the bearings from said bracket means and so arranged as to provide limited axial movement of the universal means in said second transverse direction, whereby the bearings can oscillate through limited arcs relative to the bracket means for alignment with the shaft axis while the bracket means hold the shaft substantially in fixed spacing relative to the strut in said first direction when the strut deflects sideways.

4. In a support and drive assembly for a marine propulsion pod, the combination of a hollow strut member supported only at the upper end thereof and having a relatively long fore-and-aft dimension and a relatively small beam dimension, said strut member being subject to transverse deflecting forces, at least two parallel relatively flexible torque-transmitting vertical shaft members disposed in said strut and spaced from one another in a fore-and-aft plane bisecting the strut, a plurality of bearings spaced vertically along and journalling said shafts, and a plurality of spaced first and second support bracket means attached to said strut and substantially fixed against movement with respect thereto in the beam direction, and universal means carried by said bracket means, said universal means being freely movable with respect to one of said bracket means in a fore-and-aft direction and supporting said bearings for limited oscillatory movement of the bearings with respect to the support brackets, whereby the bearings freely align themselves with the axes of said shafts while the support bracket means hold the shafts in substantially fixed relation to the strut in the beam direction when the strut deflects sideways.

5. In combination, a hollow first member which is relatively flexible in a first transverse direction and relatively rigid in a second transverse direction, said first member having a substantial unsupported length and being subject to transverse deflecting forces, a relatively flexible torque-transmitting shaft disposed in said first member, a plurality of bearings spaced longitudinally along and journalling said shaft, a plurality of first and second bracket means disposed on either side of said bearings and spaced from one another in the second transverse direction, first and second universal mounting means disposed in said first and second bracket means respectively and supporting the bearings from either side thereof, said first universal mounting means being freely movable with respect to the first bracket means in the second transverse direction, whereby relative shifting of the first bracket means with respect to the second bracket means is accommodated without imposing local bending couples on the shaft while the bearings align themselves with the shaft axis as the first member deflects.

References Cited in the file of this patent
UNITED STATES PATENTS

| 1,302,872 | Stephens | May 6, 1919 |

FOREIGN PATENTS

| 1,151,853 | France | Aug. 26, 1957 |